US011381424B2

(12) United States Patent
Munier et al.

(10) Patent No.: US 11,381,424 B2
(45) Date of Patent: Jul. 5, 2022

(54) CONTROL OF APERIODIC SIGNALING OF SRS FOR WIRELESS SYSTEMS

(71) Applicant: Telefonaktiebolaget LM Ericsson (publ), Stockholm (SE)

(72) Inventors: Florent Munier, Västra Frölunda (SE); Robert Mark Harrison, Grapevine, TX (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 517 days.

(21) Appl. No.: 16/329,948

(22) PCT Filed: Sep. 29, 2017

(86) PCT No.: PCT/SE2017/050961
§ 371 (c)(1),
(2) Date: Mar. 1, 2019

(87) PCT Pub. No.: WO2018/063084
PCT Pub. Date: Apr. 5, 2018

(65) Prior Publication Data
US 2019/0199555 A1 Jun. 27, 2019

Related U.S. Application Data

(60) Provisional application No. 62/403,013, filed on Sep. 30, 2016.

(51) Int. Cl.
*H04L 25/02* (2006.01)
*H04L 5/00* (2006.01)
(Continued)

(52) U.S. Cl.
CPC ........ *H04L 25/0226* (2013.01); *H04L 5/0051* (2013.01); *H04L 5/0096* (2013.01);
(Continued)

(58) Field of Classification Search
CPC . H04L 25/0226; H04L 5/0051; H04L 5/0096; H04L 5/001; H04W 76/27; H04W 72/042; H04W 72/0453
(Continued)

(56) References Cited

U.S. PATENT DOCUMENTS

2011/0286397 A1 11/2011 Kim et al.
2012/0039273 A1* 2/2012 Nam .................... H04L 5/0005
370/329
2013/0010659 A1* 1/2013 Chen ...................... H04L 5/001
370/280

FOREIGN PATENT DOCUMENTS

EP 2437402 A1 4/2012
JP 2012100213 A 5/2012
WO 2017173388 A1 10/2017

OTHER PUBLICATIONS

"Support of aperiodic SRS", 3GPP TSG RAN WG1 Meeting #86, Agenda Item 7.2.7.2, Source: Huawei, HiSilicon, R1-166131, Aug. 22-26, 2016. (Year: 2016).*
(Continued)

*Primary Examiner* — Chi Tang P Cheng
(74) *Attorney, Agent, or Firm* — Christopher & Weisberg, P.A.

(57) ABSTRACT

A wireless device, network node and methods are provided. The network node includes processing circuitry configured to configure an aperiodic sounding reference signal, A-SRS, switching trigger, and transmit the configured A-SRS 5 switching trigger to a wireless device. The A-SRS switching trigger is one of: a downlink control information, DCI, of a predetermined DCI format and a DCI of another predetermined DCI format for group switching. In one embodiment, the predetermined DCI format is one of 2, 2A and 3, and the other predetermined DCI format for group switching is 1A.

11 Claims, 6 Drawing Sheets

(51) Int. Cl.
*H04W 76/27* (2018.01)
*H04W 72/04* (2009.01)

(52) U.S. Cl.
CPC ..... *H04W 72/042* (2013.01); *H04W 72/0453* (2013.01); *H04W 76/27* (2018.02); *H04L 5/001* (2013.01)

(58) Field of Classification Search
USPC .......................................................... 370/329
See application file for complete search history.

(56) References Cited

OTHER PUBLICATIONS

International Search Report and Written Opinion dated Dec. 7, 2017 for International Application No. PCT/SE2017/050961 filed on Sep. 29, 2017, consisting of 13-pages.
3GPP TSG RAN WG1 Meeting #86 R1-166131; Title: Support of aperiodic SRS; Agenda Item: 7.2.7.2; Source: Huawei, HiSilicon; Document for: Dicussion/Decision; Location and Date: Gothenburg, Sweden Aug. 22-26, 2016, consisting of 2-pages.
3GPP TSG RAN WG1 #86 R1-166741; Title: SRS Collisions in Carrier Switching; Agenda Item: 7.3.7.3; Source: Samsung; Document for: Discussion and Decision; Location and Date: Gothenburg, Sweden Aug. 22-26, 2016, consisting of 2-pages.
3GPP TSG RAN WG1 Meeting #86 R1-168276; Title: Way Forward on SRS Carrier-based switching; Agenda Item: 7.2.7; Source: Huawei, HiSilicon, Softbank; Location and Date: Gothenburg, Sweden Aug. 22-26, 2106, consisting of 8-pages.
Robert Love and Vijay Nangia; Uplink Reference Signals; LTE— The UMTS Long Term Evolution: From Theory to Practice, Second Edition.; Published 2011 by John Wiley & Sons, Ltd., consisting of 7-pages.
3GPP TS 36.211 V13.2.0; 3rd Generation Partnership Project; Technical Specification Group Radio Access Network; Evolved Universal Terrestrial Radio Access (E-UTRA); Physical channels and modulation (Release 13); Jun. 2016, consisting of 168-pages.
3GPP TS 36.213 V14.0.0; 3rd Generation Partnership Project; Technical Specification Group Radio Access Network; Evolved Universal Terrestrial Radio Access (E-UTRA); Physical layer procedures (Release 14); Sep. 2016, consisting of 406-pages.
Japanese Office Action and and English Translation dated Mar. 17, 2020 issued in Application No. 2019-516130, consisting of 15-pages.
European Communication dated Mar. 22, 2021 for International Application No. 17784420.6, consisting of 7-pages.
3GPP TSG-RAN WG1 #86 R1-166532; Title: Remaing details of SRS triggering with CC switching; Source: Intel Corporation; Agenda Item: 7.2.7.2; Document for Discussion and Decision; Date and Location: Aug. 22-26, 2016, Göteborg, Sweden, consisting of 2-pages.

* cited by examiner

CONTROL OF APERIODIC SIGNALING OF SRS FOR WIRELESS SYSTEMS

CROSS-REFERENCE TO RELATED APPLICATIONS

This application is a Submission Under 35 U.S.C. § 371 for U.S. National Stage Patent Application of International Application No.: PCT/SE2017/050961, filed Sep. 29, 2017 entitled "CONTROL OF APERIODIC SIGNALLING OF SRS FOR WIRELESS SYSTEMS," which claims priority to U.S. Provisional Application No. 62/403,013, filed Sep. 30, 2016, entitled "CONTROL OF APERIODIC SIGNALING OF SRS FOR WIRELESS SYSTEMS," the entireties of both of which are incorporated herein by reference.

TECHNICAL FIELD

Wireless communications, and in particular, to control of aperiodic signaling of sounding reference signals, SRS, in wireless communications.

BACKGROUND

LTE Single-Carrier Frequency Division Multiple Access (SC-FDMA) uplink incorporates Reference Signals (RSs) for data demodulation and channel sounding. RSs are described herein, including principles related to interference randomization and coordination, and the flexible configuration of channel sounding.

Uplink RSs enables channel estimation to support coherent demodulation, channel quality estimation for uplink scheduling, power control, timing estimation and direction-of-arrival estimation to aid in downlink beamforming. Two types of RS are supported on the uplink:

Demodulation RS (DM-RS) are associated with transmitted uplink data on the Physical Uplink Shared Channel (PUSCH) and/or control signaling on the Physical Uplink Control Channel (PUCCH). These RSs are mainly used for channel estimation for coherent demodulation;

Sounding RS (SRS) are not associated with uplink data and/or control transmissions, and are mainly used for the determination of channel quality to provide frequency-selective scheduling on the uplink.

Uplink RSs are time-multiplexed with the data. The DM-RSs of a wireless device occupy the same bandwidth or resource blocks (RBs) as the wireless device's PUSCH/PUCCH data transmission.

The allocation of frequency orthogonal RB sets to different wireless devices for data transmission help provide DM-RSs that are also orthogonal to each other.

If configured by higher-layer signaling, SRSs will be transmitted on the last SC-FDMA symbol in a subframe. SRS can occupy a bandwidth different from that used for data transmission, thereby allowing wider bandwidth sounding. Wireless devices transmitting SRSs in the same subframe can be multiplexed via either Frequency Division Multiplexing (FDM) or Code Division Multiplexing (CDM).

Some characteristics for the uplink RSs include:

Constant amplitude in the frequency domain for equal excitation of all the allocated subcarriers for unbiased channel estimates;

Low Cubic Metric (CM) in the time domain such as a CM being less than the CM of data transmission, thereby allowing for the transmission power of the RSs to be boosted at the cell-edge);

Good autocorrelation properties, thereby allowing for accurate channel estimation;

Good cross-correlation properties between different RSs, thereby reducing interference from RSs transmitted on the same resources in the same or other cells.

Uplink Sounding Reference Signals (SRS)

The SRSs, which are not associated with uplink data and/or control transmission, are used for channel quality estimation to provide frequency-selective scheduling on the uplink. However, SRSs can be used for other purposes, such as to enhanced power control or to support various start-up functions for wireless devices.

Some examples include initial Modulation and Coding Scheme (MCS) selection, initial power control for data transmissions, timing advance, and frequency semi-selective scheduling where the frequency resource is assigned frequency-selectively for the first slot of a subframe and hops pseudo-randomly to a different frequency in the second slot.

SRS Subframe Configuration and Position

The subframes in which SRSs are transmitted by a wireless device within the cell are indicated by cell-specific broadcast signaling. A 4-bit cell-specific "srsSubframeConfiguration" parameter indicates 15 possible sets of subframes. SRS may be transmitted within each radio frame (additional information is provided in Third Generation Partnership Project (3GPP) 36.211, Section 5.5.3.3, which is hereby incorporated by reference). This configurability provides flexibility in adjusting the SRS overhead depending on the deployment scenario. A 16th configuration switches the SRS off completely in the cell, which may for example be implemented for a cell serving primarily high-speed wireless devices.

The SRS transmissions are in the last SC-FDMA symbol in the configured subframes, as shown in FIG. 1, which illustrates a subframe structure. The subframe structure consists of 14 SC-FDMA symbols (i.e., l=0 to l=13 denote the 14 symbols in the subframe), split into two slots containing 7 SC-FDMA symbols each. Thus, the SRS and DM-RS are located in different SC-FDMA symbols. PUSCH data transmission is not permitted on the SC-FDMA symbol designated for SRS, which results in a worst-case sounding overhead (with an SRS symbol in every subframe) of around 7%.

Duration and Periodicity of SRS Transmissions

The network node in LTE may either request an individual SRS transmission from a wireless device or configure a wireless device to transmit SRS periodically until terminated. A 1-bit wireless device-specific signaling parameter, "duration", indicates whether the requested SRS transmission is single or periodic. If periodic SRS transmissions are configured for a wireless device, the periodicity may be any of 2, 5, 10, 20, 40, 80, 160 or 320 ms. The SRS periodicity and SRS subframe offset within the period are configured by a 10-bit wireless device-specific dedicated signaling parameter called "srs-ConfigIndex". In 3GPP, release 10, a mechanism for dynamically triggering an aperiodic SRS transmission using the PDCCH was introduced.

SRS Symbol Structure

In order to support frequency-selective scheduling between various wireless devices, SRS from different wireless devices with different sounding bandwidths can overlap. In order to support this overlap, Interleaved Frequency Division Multiple Access (IFDMA) is used in the SRS SCFDMA symbol, with a Repetition Factor (RPF) of 2. In the time domain, RPF is equivalent to a frequency-domain decimation factor, giving the spacing between occupied subcarriers of an SRS signal with a comb-like spectrum.

Thus, RPF=2 implies that the signal occupies every 2nd subcarrier within the allocated sounding bandwidth as shown by way of example in FIG. 2, where SC-FDMA symbol 6 (l=6) is occupied by SRSs from 4 different wireless devices ('UEs') on each of the two SRS "combs". Note that the comb carrying SRSs for UEs 2, 3, and 4 is further multiplexed in frequency such that each pair of PRBs on the comb carries a different SRS. The middle 2 PRBs of FIG. 2 therefore contain UE#2's SRS, while the lower and upper PRBs contain SRSs for UEs 3 and 4, respectively. Also note that only one PRB of the PRB pairs carrying SRSs for UEs 3 and 4 is shown in FIG. 2, for brevity. Finally, an example PUSCH transmission is shown, where SC-FDMA symbols 0-2 and 4-5 carry PUSCH modulation symbols and SC-FDMA symbol 3 carries the reference signal for the PUSCH. Using a larger RPF may provide more flexibility in how the bandwidth could be allocated between wireless devices, but a larger RPF may reduce the sounding sequence length and the number of available SRS sequences. Therefore the RPF is typically limited to 2.

Due to the IFDMA structure of the SRS symbol, a wireless device is assigned, as part of its configurable SRS parameters, the "transmissionComb" index of 0 or 1 on which to transmit the SRS. The RS sequences used for the SRS are the same as for the DM-RS, thereby resulting in the SRS sequence length being restricted to multiples of two, three and/or five times the RB size. Also, the SRS bandwidth is an even number due to the RPF of 2 and the minimum SRS sequence length being 12.

Similarly to the DM-RS, simultaneous SRS can be transmitted from various wireless devices using the same RBs and the same offset of the comb, using different cyclic time shifts of the same base sequence to accomplish orthogonal separation. For the SRS, eight cyclic time shifts per SRS comb are supported where the eight cyclic time shifts are evenly spaced and the cyclic shift is individually configured for each wireless device.

SRS Bandwidths

Some of the factors that affect the SRS bandwidth include: maximum power of the wireless device, the number of sounding wireless devices, and the sounding bandwidth. Full bandwidth sounding provides the most complete channel information when the wireless device is sufficiently close to the network node. However, full bandwidth sounding degrades as the path-loss increases when the wireless device cannot further increase its transmit power to maintain the transmission across the full bandwidth. Full bandwidth transmission of SRS also limits the number of simultaneous wireless devices whose channels can be sounded, due to the limited number of cyclic time shifts. To improve the Signal to Noise Ratio (SNR) and support a larger number of SRSs, up to four SRS bandwidths can be simultaneously supported in LTE depending on the system bandwidth. To provide flexibility for the SRS bandwidths values, eight sets of four SRS bandwidths may be defined for each possible system bandwidth. Radio Resource Control (RRC) signaling indicates which of the eight sets is applicable in the cell by using a 3-bit cell-specific parameter such as "srs-BandwidthConfig". This allows some variability in the maximum SRS bandwidths as the SRS region does not include the PUCCH region near the edges of the variable system bandwidth.

The specific SRS bandwidth used for a wireless device is also configured by a 2-bit wireless device-specific parameter such as "srs-Bandwidth". Table 1 illustrates the smallest sounding bandwidth supported in LTE is 4 RBs.

TABLE 1

RB allocation and configuration of SRS

| | Number of Resource Blocks | | | |
|---|---|---|---|---|
| Configuration | SRS-BW 0 | SRS-BW 1 | SRS-BW 2 | SRS-BW 3 |
| 0 | 48 | 24 | 12 | 4 |
| 1 | 48 | 16 | 8 | 4 |
| 2 | 40 | 20 | 4 | 4 |
| 3 | 36 | 12 | 4 | 4 |
| 4 | 32 | 16 | 8 | 4 |
| 5 | 24 | 4 | 4 | 4 |
| 6 | 20 | 4 | 4 | 4 |
| 7 | 16 | 4 | 4 | 4 |

A small sounding bandwidth of 4 RBs provides higher-quality channel information from a power-limited wireless device. The sounding bandwidths are constrained to be multiples of each other to support frequency hopping of the different narrowband SRS bandwidths (additional information can be found in 3GPP Technical Specification (TS) 36.211, Section 5.5.3.2, which is hereby incorporated by reference).

Frequency hopping can be enabled/disabled for a wireless device based on the value of the parameter "freqDomainPosition". A tree structure of the SRS bandwidths limits the possible starting positions for the different SRS bandwidths, which reduce the overhead for signaling the starting position to 5 bits (signaled to each wireless device by the parameter "freqDomainPosition"). Table 2 illustrates various SRS configurable parameters which are signaled to a wireless device.

TABLE 2

SRS parameters

| Sounding RS parameter name | Significance | Signalling type |
|---|---|---|
| SRS-BandwidthConfig | Max SRS BW in Cell | Cell Specific |
| SRS-SubframeConfig | Sets of subframes, SRS may be transmitted in Cell | Cell Specific |
| SRS-Bandwidth | SRS transmission BW for wireless device | Wireless Device Specific |
| FreqDomainPosition | Frequency-domain position | Wireless Device Specific |
| SRS-HoppingBandwidth | Frequency hop size | Wireless Device Specific |
| Duration | Single SRS/periodic | Wireless Device Specific |
| SRS-ConfigIndex | Periodicity and subframe offset | Wireless Device Specific |
| Transmission Comb | Transmission comb offset | Wireless Device Specific |
| $n_{SRS}^{cs}$ | Cyclic Shift | Wireless Device Specific |

SRS and Carrier Aggregation: Aperiodic Triggering

The SRSs are used for uplink channel sounding to support dynamic uplink resource allocation and to support reciprocity-aided beamforming in the downlink such as in TDD operation. In 3GPP Release 8 ("Release 8"), SRSs allow for uplink sounding from a single transmit antenna only. With the introduction of uplink multiple-antenna transmission in 3GPP Release 10 ("Release 10"), SRS transmission from all the uplink antenna ports are used in order to provide all the spatial dimensions of the channel to be sounded. The same mechanisms available in Release 8 are used to separate the SRS transmissions from different antenna ports and different transmission comb indices of the IFDMA structure.

Nevertheless, the need for SRSs for up to four antenna ports increases the demand on SRS resources if all transmit antennas are to be sounded at a reasonable rate. Semi-static configuration of the resources via higher layer signaling such as RRC signaling is less appropriate than it was for Release 8. Therefore, Release 10 introduces the possibility of dynamically triggering aperiodic SRS transmissions via the Physical Downlink Control Channel (PDCCH). These dynamic aperiodic SRS transmissions are known as 'type 1' SRSs, while the Release 8 RRC-configured SRSs are known as 'type 0' in Release 10.

An indicator in an uplink resource grant on the PDCCH can be used to trigger a single type 1 SRS transmission. This provides for rapid channel sounding for responding to changes in traffic or channel conditions, without using up SRS resources for a long period. In downlink control information (DCI) Format 0, one new bit indicates activation of a type 1 SRS according to a set of parameters that is previously configured via RRC signaling. In DCI Format 4, which is used for scheduling uplink Single User Multiple Input Multiple Output (SU-MIMO) transmissions, two new bits allow one of three sets of RRC-configured type 1 SRS transmission parameters to be triggered (the remaining state indicates no type 1 SRS activation). In the case of uplink multiple-antenna transmission, SRSs is simultaneously triggered on multiple antenna ports. Other improvements to the SRSs, including coordination of SRS transmission resource configurations and frequency-hopping patterns, are also considered for cooperative MIMO schemes and inter-cell interference coordination.

SRSs can be triggered on any serving cell either by higher layer signaling or dynamically via the DCI messages for UL grants. When carrier aggregation is configured, a wireless device may be configured with SRS parameters for both types of SRS triggering on each serving cell. Below are several rules for SRSs in relation to transmissions on multiple component carriers (CCs):

SRSs may be transmitted simultaneously on different CCs;
  If a PUCCH transmission on the Policy Control and Charging (PCC) corresponds with SRS on an SCC, the wireless device transmits the SRS on the SCC if the PUCCH uses a shortened format;
  If a PUSCH transmission corresponds with SRS on different CCs:
    PUSCH transmitted in any cell-specifically configured SRS subframe is rate matched around the SRS resources on the same CC;
    If PUSCH is transmitted in the same Single-Carrier Frequency Division Multiple Access (SC-FDMA) symbol on a different CC from the same UE, the SRS is dropped.
SRS Carrier Based Switching:

In Carrier Aggregation (CA), there exist communication scenarios where downlink traffic is heavier than uplink traffic, thereby leading to a greater number of aggregated downlink component carriers (CC) than the number of (aggregated) uplink CCs than in balanced communication traffic scenarios as typical wireless devices download more data than is uploaded. Moreover, for the existing wireless device categories, the typical CA capable wireless devices only support one or two uplink CCs.

For the carrier supporting both uplink and downlink, transmit diversity based feedback without Pre-coding Matrix Indicator (PMI) and with SRS may be helpful as channel reciprocity can be used. However, since wireless devices generally have the capability of aggregating larger number of DL carriers than that in the UL, some of Time Division Duplex (TDD) carriers with DL transmission for the wireless device will have no UL transmission including SRS, and channel reciprocity cannot be utilized for these carriers.

Such situations will become more severe with CA enhancement of up to 32 CCs where a large portion of CCs are TDD.

SUMMARY

According to one embodiment of the disclosure, a network node is provided. The network node includes processing circuitry configured to configure an aperiodic sounding reference signal, A-SRS, switching trigger, and transmit the configured A-SRS switching trigger to a wireless device. The A-SRS switching trigger is one of: a downlink control information, DCI, of a predetermined DCI format and a DCI of another predetermined DCI format for group switching.

According to one embodiment of this aspect, the predetermined DCI format for group switching is one of 2, 2A and 3, and the other predetermined DCI format is 1A. According to one embodiment of this aspect, the processing circuitry is further configured to configure the wireless device to use a preconfigured pattern table of to and from carriers to determine a sequence for performing A-SRS carrier switching, the A-SRS switching trigger further configured to trigger the wireless device to use the preconfigured pattern table for performing A-SRS carrier switching. According to one embodiment of this aspect, the configuring of the wireless device to use the preconfigured pattern table includes configuring the wireless device to use a preconfigured equation to determine the sequence of A-SRS carrier switching.

According to one embodiment of this aspect, the DCI indicates an index of the preconfigured pattern table for performing A-SRS carrier switching. According to one embodiment of this aspect, the DCI indicates both the to and from carriers for performing A-SRS carrier switching.

According to another embodiment of the disclosure, a method is provided. An aperiodic sounding reference signal, A-SRS, switching trigger is configured. The A-SRS switching trigger being one of: a downlink control information, DCI, of a predetermined DCI format and a DCI of another predetermined DCI format for group switching. Transmit the configured A-SRS switching trigger is transmitted to a wireless device.

According to one embodiment of this aspect, the predetermined DCI format for group switching is one of 2, 2A and 3, and the other predetermined DCI format is 1A. According to one embodiment of this aspect, the wireless device is configured to use a preconfigured pattern table of to and from carriers to determine a sequence for performing A-SRS carrier switching, the A-SRS switching trigger further configured to trigger the wireless device to use the preconfigured pattern table for performing A-SRS carrier switching. According to one embodiment of this aspect, the configuring of the wireless device to use the preconfigured pattern table includes configuring the wireless device to use a preconfigured equation to determine the sequence of A-SRS carrier switching. According to one embodiment of this aspect, the DCI indicates an index of the preconfigured pattern table for performing A-SRS carrier switching.

According to one embodiment of this aspect, the DCI indicates both the to and from carriers for performing A-SRS carrier switching.

According to another embodiment of the disclosure, a wireless device is provided. The wireless device includes processing circuitry configured to receive an aperiodic sounding reference signal, A-SRS, switching trigger, and trigger A-SRS switching based on the received A-SRS switching trigger. The A-SRS switching trigger is one of: a downlink control information, DCI, of a predetermined DCI format and a DCI of another predetermined DCI format for group switching.

According to one embodiment of this aspect, the predetermined DCI format for group switching is one of 2, 2A and 3, and the other predetermined DCI format is 1A. According to one embodiment of this aspect, the processing circuitry is further configured to use a preconfigured pattern table of to and from carriers to determine a sequence for performing A-SRS carrier switching. According to one embodiment of this aspect, the using of the preconfigured pattern table includes using a preconfigured equation to determine the sequence of A-SRS carrier switching. According to one embodiment of this aspect, the DCI indicates an index of the preconfigured pattern table for performing A-SRS carrier switching.

According to one embodiment of this aspect, the DCI indicates both the to and from carriers for performing A-SRS carrier switching.

According to another embodiment of the disclosure, a method is provided. An aperiodic sounding reference signal, A-SRS, switching trigger is received. The A-SRS switching trigger is one of: a downlink control information, DCI, of a predetermined DCI format and a DCI of another predetermined DCI format for group switching.

According to one embodiment of this aspect, the predetermined DCI format is one of 2, 2A and 3, and the other predetermined DCI format for group switching is 1A. According to one embodiment of this aspect, a preconfigured pattern table of to and from carriers is used to determine a sequence for performing A-SRS carrier switching. According to another embodiment of this, the using of the preconfigured pattern table includes using a preconfigured equation to determine the sequence of A-SRS carrier switching. According to one embodiment of this aspect, the DCI indicates an index of the preconfigured pattern table for performing A-SRS carrier switching. According to one embodiment of this aspect, the DCI indicates both the to and from carriers for performing A-SRS carrier switching.

According to one embodiment of the disclosure, a network node is provided. The network node includes trigger configuration processing module configured to: configure an aperiodic sounding reference signal, A-SRS, switching trigger, and transmit the configured A-SRS switching trigger to a wireless device. The A-SRS switching trigger is one of: a downlink control information, DCI, of a predetermined DCI format and a DCI of another predetermined DCI format for group switching.

According to one embodiment of the disclosure, a wireless device is provided. The wireless device includes switching trigger processing module configured to receive an aperiodic sounding reference signal, A-SRS, switching trigger, and trigger A-SRS switching based on the received A-SRS switching trigger. The A-SRS switching trigger is one of: a downlink control information, DCI, of a predetermined DCI format and a DCI of another predetermined DCI format for group switching.

According to one aspect of the disclosure, a network node is provided. Network node includes processing circuitry configured to: configure an aperiodic sounding reference signal, A-SRS, carrier switching trigger, the A-SRS carrier switching trigger configured to cause a wireless device to performing A-SRS carrier switching from a first carrier to second carrier for transmitting an A-SRS using the second carrier, and transmit the configured A-SRS carrier switching trigger to the wireless device.

According to one embodiment of this aspect, the A-SRS carrier switching trigger is included in a downlink control information, DCI, having a DCI format. According to one embodiment of this aspect, the DCI format for wireless device A-SRS carrier switching is one of DCI formats 2, 2A and 1A. According to one embodiment of this aspect, the DCI indicates both the first carrier and second carrier for performing A-SRS carrier switching. According to one embodiment of this aspect, the DCI format for group A-SRS carrier switching is derived from DCI format 3. According to one embodiment of this aspect, the SRS is power controlled by the DCL.

According to one embodiment of this aspect, the processing circuitry is further configured to: configure the wireless device to use a preconfigured pattern table for determining the second carrier from a plurality of carriers for performing A-SRS carrier switching. The A-SRS carrier switching trigger is further configured to trigger the wireless device to use the preconfigured pattern table for performing A-SRS carrier switching. According to one embodiment of this aspect, the preconfigured pattern table is configured using RRC signaling. According to one embodiment of this aspect, the configuring of the wireless device to use the preconfigured pattern table includes configuring the wireless device to use a preconfigured equation to determine the second carrier from the plurality of carriers for performing A-SRS carrier switching. According to one embodiment of this aspect, the DCI indicates an index in the preconfigured pattern table for performing A-SRS carrier switching.

According to another aspect of the disclosure, a method for a network node is provided. An aperiodic sounding reference signal, A-SRS, carrier switching trigger is configured. The A-SRS carrier switching trigger is configured to cause a wireless device to perform A-SRS carrier switching from a first carrier to second carrier for transmitting an A-SRS using the second carrier. The configured A-SRS carrier switching trigger is transmitted to the wireless device.

According to one embodiment of this aspect, the A-SRS carrier switching trigger is included in a downlink control information, DCI, having a DCI format. According to one embodiment of this aspect, the DCI format for wireless device A-SRS carrier switching is one of DCI formats 2, 2A and 1A. According to one embodiment of this aspect, the DCI format for group A-SRS carrier switching is derived from DCI format 3. According to one embodiment of this aspect, the SRS is power controlled by the DCL. According to one embodiment of this aspect, the DCI indicates both the first carrier and second carrier for performing A-SRS carrier switching.

According to one embodiment of this aspect, the wireless device is configured to use a preconfigured pattern table for determining the second carrier from a plurality of carriers for performing A-SRS carrier switching. The A-SRS carrier switching trigger is further configured to trigger the wireless device to use the preconfigured pattern table for performing A-SRS carrier switching. According to one embodiment of this aspect, the preconfigured pattern table is configured using RRC signaling.

According to one embodiment of this aspect, the configuring of the wireless device to use the preconfigured pattern table includes configuring the wireless device to use a preconfigured equation to determine the second carrier from the plurality of carriers for performing A-SRS carrier switching. According to one embodiment of this aspect, the DCI indicates an index in the preconfigured pattern table for performing A-SRS carrier switching.

According to another aspect of the disclosure, a wireless device is provided. The wireless device includes processing circuitry configured to: receive an aperiodic sounding reference signal, A-SRS, carrier switching trigger, perform A-SRS carrier switching from a first carrier to second carrier for transmitting an A-SRS using the second carrier based on the A-SRS carrier switching trigger, and transmit A-SRS on the second carrier.

According to one embodiment of this aspect, the A-SRS carrier switching trigger is included in a downlink control information, DCI, having a DCI format. According to one embodiment of this aspect, the DCI format for wireless device A-SRS carrier switching is one of DCI formats 2, 2A and 1A. According to one embodiment of this aspect, the DCI format for group A-SRS carrier switching is derived from DCI format 3. According to one embodiment of this aspect, the SRS is power controlled by the DCL. According to one embodiment of this aspect, the DCI indicates both the first carrier and second carrier for performing A-SRS carrier switching.

According to one embodiment of this aspect, the processing circuitry is further configured to use a preconfigured pattern table for determining the second carrier from a plurality of carriers for performing A-SRS carrier switching. The A-SRS carrier switching trigger is further configured to trigger the wireless device to use the preconfigured pattern table for performing A-SRS carrier switching. According to one embodiment of this aspect, the preconfigured pattern table is configured using RRC signaling. According to one embodiment of this aspect, using of the preconfigured pattern table includes using a preconfigured equation to determine the second carrier from the plurality of carriers for performing A-SRS carrier switching. According to one embodiment of this aspect, the DCI indicates an index in the preconfigured pattern table for performing A-SRS carrier switching.

According to one aspect of the disclosure, a method for a wireless device is provided. An aperiodic sounding reference signal, A-SRS, carrier switching trigger is received. A-SRS carrier switching is performed from a first carrier to second carrier for transmitting an A-SRS using the second carrier based on the A-SRS carrier switching trigger. A-SRS is transmitted on the second carrier.

According to one embodiment of this aspect, the A-SRS carrier switching trigger is included in a downlink control information, DCI, having a DCI format. According to one embodiment of this aspect, the DCI format for wireless device A-SRS carrier switching is one of DCI format 2, 2A and 1A. According to one embodiment of this aspect, the DCI format for group A-SRS carrier switching is derived from DCI format 3. According to one embodiment of this aspect, the SRS is power controlled by the DCL. According to one embodiment of this aspect, the DCI indicates both the first carrier and second carrier for performing A-SRS carrier switching.

According to one embodiment of this aspect, a preconfigured pattern table is used for determining the second carrier from a plurality of carriers for performing A-SRS carrier switching. The A-SRS carrier switching trigger is further configured to trigger the wireless device to use the preconfigured pattern table for performing A-SRS carrier switching. According to one embodiment of this aspect, the preconfigured pattern table is configured using RRC signaling. According to one embodiment of this aspect, using of the preconfigured pattern table includes using a preconfigured equation to determine the second carrier from the plurality of carriers for performing A-SRS carrier switching. According to one embodiment of this aspect, the DCI indicates an index in the preconfigured pattern table for performing A-SRS carrier switching.

According to another aspect of the disclosure, a network node is provided. A trigger configuration processing module is configured to configure an aperiodic sounding reference signal, A-SRS, carrier switching trigger. The A-SRS carrier switching trigger is configured to cause a wireless device to perform A-SRS carrier switching from a first carrier to second carrier for transmitting an A-SRS using the second carrier. The trigger configuration processing module is configured to transmit the configured A-SRS carrier switching trigger to the wireless device.

According to another aspect of the disclosure, a wireless device is provided. The wireless device includes switching trigger processing module configured to: receive an aperiodic sounding reference signal, A-SRS, carrier switching trigger, perform A-SRS carrier switching from a first carrier to second carrier for transmitting an A-SRS using the second carrier based on the A-SRS carrier switching trigger, and transmit A-SRS on the second carrier.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
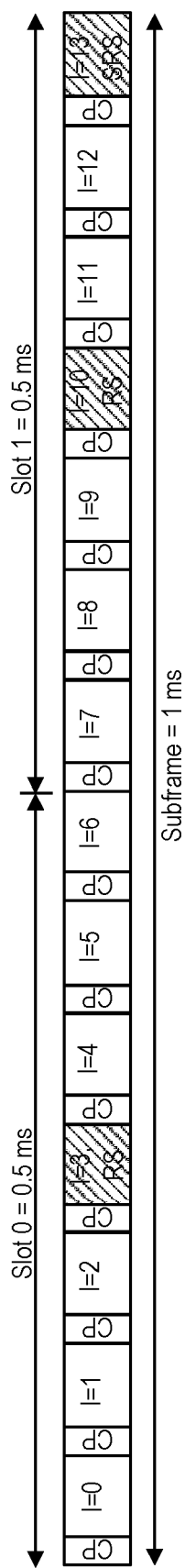
FIG. 1 illustrates a subframe structure.
Figure 2:
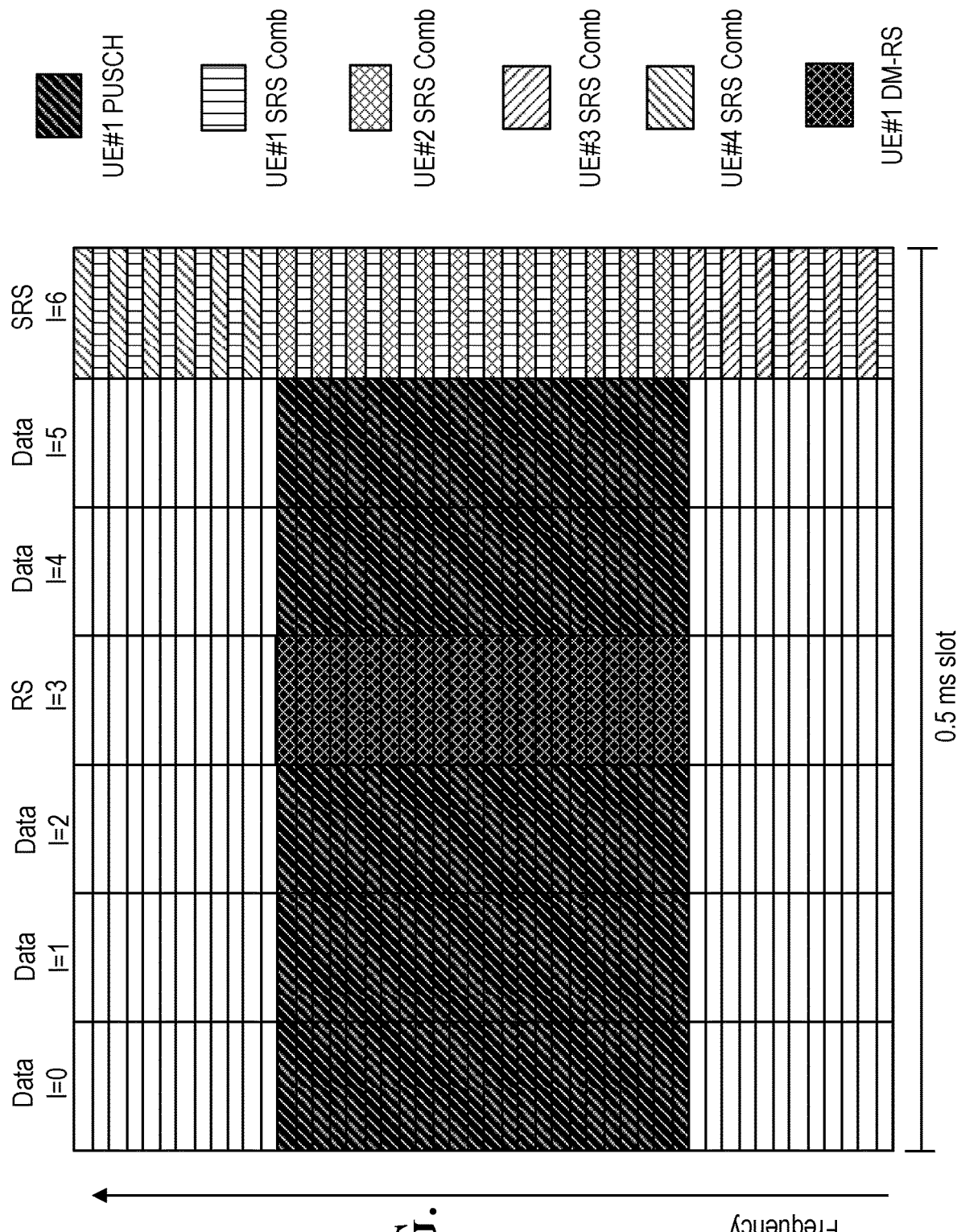
FIG. 2 illustrates a SRS comb structure.

Allowing fast carrier switching to and between TDD UL carriers can be a solution to allow SRS transmission on these TDD carriers.

In this disclosure, solutions for triggering signals for A-SRS as well as signaling of the origin and target carriers for SRS switching are provided. In one or more embodiments, solutions described herein allow for the identification of the "to" and "from" carriers during SRS switching, i.e., switching from a first carrier to a second carrier. In one or more embodiments, solutions described herein allow the configuration of the trigger for aperiodic switching. Note that although terminology from the third generation partnership project (3GPP), i.e., long term evolution (LTE), is used in this disclosure as an example, this should not be seen as limiting the scope of the disclosure to only the aforementioned system. Other wireless systems, including NR (i.e., 5G), wideband code division multiple access (WCDMA), WiMax, ultra mobile broadband (UMB) and global system for mobile communications (GSM), among others, may also benefit from exploiting the concepts and methods covered within this disclosure.

Also note that terminology such as eNodeB and wireless device should be considered non-limiting and does in particular not imply a certain hierarchical relation between the two. In general, "eNodeB" could be considered as one device and "wireless device" is considered another device, and these two devices communicate with each other over some radio channel. Also, while the disclosure focuses on wireless transmissions in the downlink, but embodiments are equally applicable in the uplink.

The term wireless device used herein may refer to any type of wireless device communicating with a network node and/or with another wireless device in a cellular or mobile communication system. Examples of a wireless device are user equipment (UE), target device, device to device (D2D) wireless device, machine type wireless device or wireless device capable of machine to machine (M2M) communication, PDA, iPAD, Tablet, mobile terminals, smart phone, laptop embedded equipped (LEE), laptop mounted equipment (LME), USB dongles etc.

The term "network node" used herein may refer to a radio network node or another network node, e.g., a core network node, MSC, MME, O&M, OSS, SON, positioning node (e.g. E-SMLC), MDT node, etc.

The term "network node" or "radio network node" used herein can be any kind of network node comprised in a radio network which may further comprise any of base station (BS), radio base station, base transceiver station (BTS), base station controller (BSC), radio network controller (RNC), evolved Node B (eNB or eNodeB), Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS) etc.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Before describing in detail exemplary embodiments, it is noted that the embodiments reside primarily in combinations of apparatus components and processing steps related to control of aperiodic signaling of sounding reference signals, SRS, in wireless communications.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Parameters for Transmitting SRS
Triggers for SRS

In 3GPP release 13, Periodic SRS and one-shot SRS transmissions are referred to as trigger type 0 SRS transmissions which are configured entirely by RRC signaling. Aperiodic SRS transmission is labeled trigger type 1 SRS transmission and is configured via RRC signaling (semi-static part) but triggered by DCI (dynamic part). Aperiodic SRS has been introduced in Release 10. The trigger for transmission is the SRS Request flag in Physical Downlink Control Channel (PDCCH) DCI Formats 0/4/1A (for FDD and TDD) and DCI Formats 2B/2C for TDD alone. Different sets of parameters are set via RRC based on the format chosen as shown in Table 3.

TABLE 3

SRS parameter sets

| format | RRC parameter set name | Trigger bit size |
|---|---|---|
| 0 | srs-ConfigApDCI-Format0 | 1 |
| 1a 2b 2c 2d | srs-ConfigApDCI-Format1a2b2c | 1 |
| 4 | srs-ConfigApDCI-Format4 | 2 |

Note that compared to other formats, DCI format 4 can be controlled using 3 different sets of parameters. This is why the trigger uses two bits, that allow each set to be addressed. When a wireless device receives a DL grant for PDSCH, the wireless device transmits Hybrid Automatic Repeat Request Acknowledgement (HARQ-ACK). Therefore, if the wireless device receives an aperiodic SRS switching trigger in a DL grant, the wireless device transmits HARQ-ACK as well as switches to another carrier to transmit SRS. However, in some embodiments it is not necessary to decode the Physical Downlink Shared Channel (PDSCH) prior to switching to transmit SRS. The PDSCH decoding can continue in parallel during the switching process, and the wireless device can transmit HARQ-ACK on after transmitting SRS on the other carrier.

Therefore, in an embodiment, when a wireless device receives a DL grant triggering A-SRS carrier switching transmission, the wireless device transmits the A-SRS on the different carrier in the special subframe of that carrier, where that special subframe is the one that is just prior to the subframe in which the HARQ-ACK corresponding to the DL grant is to be transmitted.

In some embodiments, a wireless device is configured for an aperiodic SRS transmission will send SRS in the 4th subframe following detection of the trigger, at the earliest, based on the RRC configuration. Such embodiments include when DCI formats 3 and 3A are used to trigger A-SRS carrier switching, since these do not require the transmission of HARQ-ACK. In one or more embodiments, SRS parameters for A-SRS carrier based switching can reuse the SRS parameter sets from legacy. Additional, switching-only related parameters may be added as a separate set.

DCI formats 1× and 2× are used for scheduling of downlink data. In 3GPP release 13, only formats 1A 2B/2C/2D include an SRS request flag. Moreover, DCI format 1A can be used in common and wireless device specific search space and DCI Formats 1, 1B, 1D, 2, 2A, 2B, 2C, and 2D in wireless device specific search space, using C-RNTI masking. Moreover, group DCI format 3 for Transmit Power Control (TPC) could handle the SRS trigger if the SRS flag is added.

In one or more embodiments, to trigger SRS via DCI, the SRS trigger is added to DCI formats 2 and 2A. In one or more other embodiments, the use of the aperiodic SRS flag is restricted to existing formats for SRS switching. In one or more other embodiments, DCI1A is used to carry an SRS trigger for group switching. In another embodiment, DCI3 format is used to both trigger SRS and control the SRS TPC.

From and to carrier identification, i.e., identification a first carrier and a second carrier where the carrier switching is from the first carrier to the second carrier.

When more than 1 CC is configured without an UL transmission, there is a need to address the origin carrier, i.e., first carrier, and the destination carrier, i.e., second carrier, of the SRS switching. There are two possible solutions discussed below.

The first solution is a table of fixed switching patterns which are followed in sequence by the wireless device. This can be configured in the RRC and the origin and destination carrier are then decided at each transmission according to the pattern. Let $f_{cc}^o$ be the carrier number of the origin carrier and $f_{cc}^d$ the carrier number of the destination carrier. The carrier pair is decided by $$\{f_{cc}^o(n), f_{cc}^d(n)\} = x(n + N_{srspatternoffset} \mod(N_{srspatterns})) \quad \text{(Eq. 1)}$$

With x(i) defined as the pattern for index i in the switching pattern table. n is the subframe number and $+N_{srspatternoffset}$ is a configurable table index offset. The table is generated using the following equations:

$$\text{Source\_cc(index)} = \text{active\_cc}(\text{floor}(\text{index}/n\text{rof\_srs\_cc}) \mod n\text{rof\_active\_cc}) \quad \text{(Eq. 2)}$$

$$\text{Destination\_cc(index)} = \text{index} \mod(n\text{rof\_srs\_cc}) \quad \text{(Eq. 3)}$$

This solution does not require any DCI signals or RRC signals and can be implemented at initial configuration of the wireless device for SRS carrier switching. An example for the sequence of pattern table is shown in Table 4.

TABLE 4

SRS switching sequence table for 4DL 2UL CCs

| index | Source carrier number | Destination carrier number |
|---|---|---|
| 0 | 0 | 2 |
| 1 | 0 | 3 |
| 2 | 1 | 2 |
| 3 | 1 | 3 |

Figure 3:
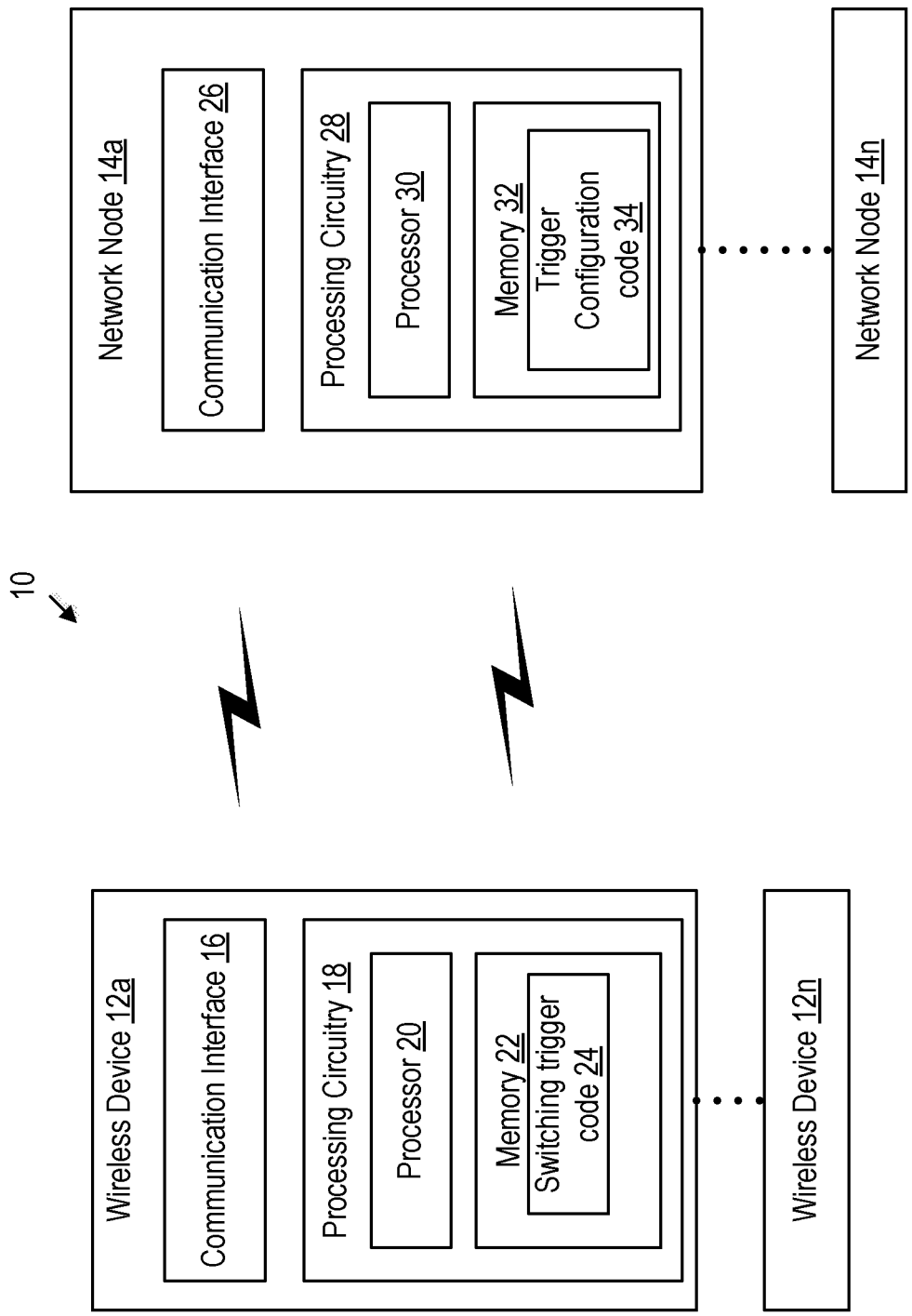
FIG. 3 illustrates a block diagram of an exemplary system for control of aperiodic signaling of sounding reference signals, SRS, in wireless communications in accordance with the principles of the disclosure.

Referring now to the drawing figures in which like reference designators refer to like elements there is shown in FIG. 3 an exemplary system for control of aperiodic signaling of sounding reference signals, SRS, in wireless communications in accordance with the principles of the present disclosure and designated generally as "10." System 10 includes one or more wireless devices 12a-12n (collectively referred to as wireless device 12) and one or more network nodes 14a-14n (collectively referred to as network node 14), in communication with each other via one or more communication networks using one or more communication protocols, where wireless device 12 and/or network node 14 are configured to perform the processes described herein.

Wireless device 12 includes one or more communication interfaces 16 for communicating with one or more other wireless devices 12, network nodes 14, and/or other elements in system 10. In one or more embodiments, communication interface 16 includes one or more transmitters and/or one or more receivers. Wireless device 12 includes processing circuitry 18. Processing circuitry 18 includes processor 20 and memory 22. In addition to a traditional processor and memory, processing circuitry 18 may comprise integrated circuitry for processing and/or control, e.g., one or more processors and/or processor cores and/or FPGAs (Field Programmable Gate Array) and/or ASICs (Application Specific Integrated Circuitry). Processor 20 may be configured to access (e.g., write to and/or reading from) memory 22, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 22 may be configured to store code executable by processor 20 and/or other data, e.g., data pertaining to communication, e.g., configuration and/or address data of nodes, etc.

Processing circuitry 18 may be configured to control any of the methods and/or processes described herein and/or to cause such methods and/or processes to be performed, e.g., by wireless device 26. Processor 20 corresponds to one or more processors 20 for performing wireless device 12 functions described herein. Wireless device 12 includes memory 22 that is configured to store data, programmatic software code and/or other information described herein. In one or more embodiments, memory 22 is configured to store switching trigger code 24. For example, switching trigger code 24 includes instructions that, when executed by processor 20, causes processor 20 to perform the process discussed in detail with respect to FIG. 5 and embodiments discussed herein.

Network node 14 includes one or more communication interfaces 26 for communicating with one or more other network nodes 14, wireless device 12, and/or other elements in system 10. In one or more embodiments, communication interface 26 includes one or more transmitters and/or one or more receivers. Network node 14 includes processing circuitry 28. Processing circuitry 28 includes processor 30 and memory 32. In addition to a traditional processor and memory, processing circuitry 28 may comprise integrated circuitry for processing and/or control, e.g., one or more processors and/or processor cores and/or FPGAs (Field Programmable Gate Array) and/or ASICs (Application Specific Integrated Circuitry). Processor 30 may be configured to access (e.g., write to and/or reading from) memory 32, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 32 may be configured to store code executable by processor 30 and/or other data, e.g., data pertaining to communication, e.g., configuration and/or address data of nodes, etc.

Processing circuitry 28 may be configured to control any of the methods and/or processes described herein and/or to cause such methods and/or processes to be performed, e.g., by network node 14. Processor 30 corresponds to one or more processors 30 for performing network node 14 functions described herein. Network node 14 includes memory 32 that is configured to store data, programmatic software code and/or other information described herein. In one or more embodiments, memory 32 is configured to store trigger configuration code 34. For example, trigger configuration code 34 includes instructions that, when executed by processor 30, causes processor 30 to perform the process discussed in detail with respect to FIG. 4 and embodiments discussed herein.

Figure 4:
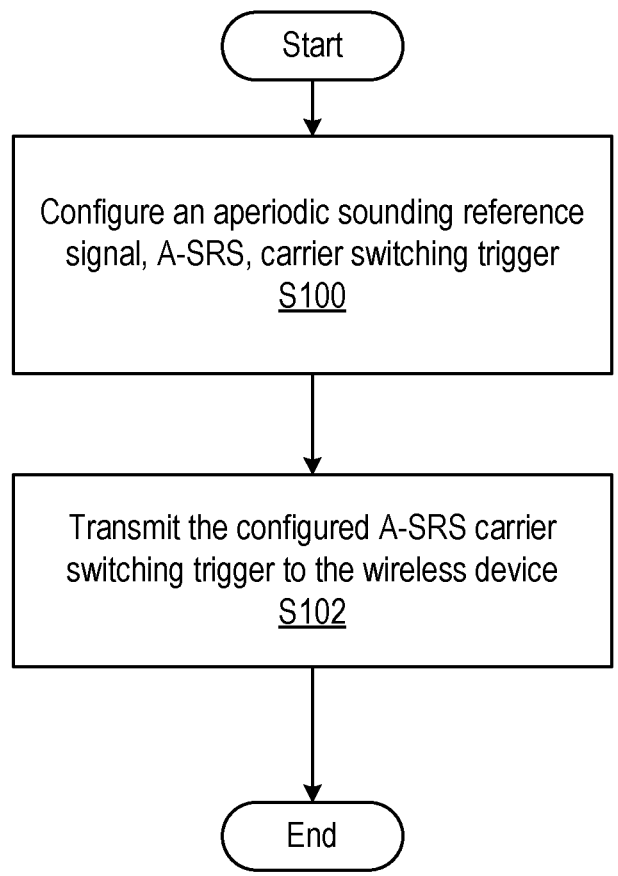
FIG. 4 illustrates a flow diagram of an exemplary trigger configuration process of trigger configuration code in accordance with the teachings of the disclosure.

FIG. 4 is a flow diagram of an exemplary trigger configuration process of trigger configuration code 34 in accordance with the teachings of the disclosure. Processing circuitry 28 configures an aperiodic sounding reference signal, A-SRS, carrier switching trigger, as described herein (Block S100). In one or more embodiments, the A-SRS carrier switching trigger is configured to cause wireless device 12 to perform A-SRS carrier switching from a first carrier to second carrier for transmitting an A-SRS using the second carrier. Processing circuitry 28 transmits the configured A-SRS carrier switching trigger to wireless device 12, as described herein (Block S102).

Figure 5:
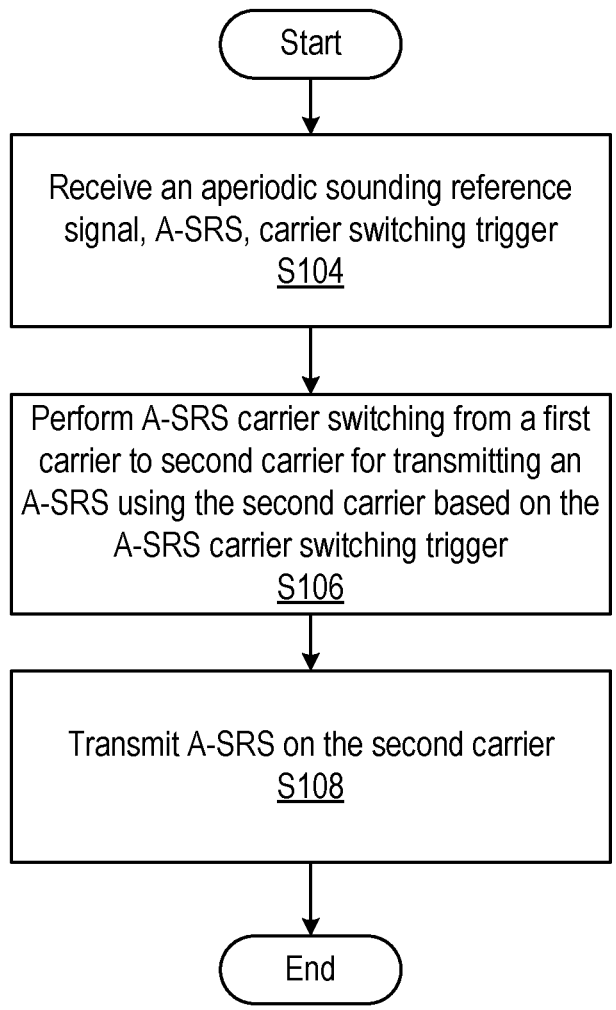
FIG. 5 is a flow diagram of an exemplary switching trigger process of switching trigger code in accordance with the teachings of the disclosure.

FIG. 5 is a flow diagram of an exemplary switching trigger process of switching trigger code 24 in accordance with the teachings of the disclosure. Processing circuitry 18 receive an aperiodic sounding reference signal, A-SRS, carrier switching trigger, as described herein (Block S104). Processing circuitry 18 performs A-SRS carrier switching from a first carrier to second carrier for transmitting an A-SRS using the second carrier based on the A-SRS carrier switching trigger (Block S106). Processing circuitry 18 is configured to transmit A-SRS on the second carrier, as described herein (S108).

The following are one or more embodiments of the disclosure:

For trigger based switching:

In a first embodiment, to trigger SRS carrier switching via DCI, the SRS carrier switching trigger is added to DCI formats 2 and 2A. In a second embodiment the use of the aperiodic SRS flag is restricted to existing formats for SRS carrier switching. In one or more embodiments, the SRS carrier switching trigger is used to trigger SRS transmission but where the transmission causes wireless device 12 to switch from a cell that wireless device 12 can transmit PUSCH on to one that wireless device 12 is not able to transmit PUSCH on to.

In another embodiment, DCI1A is used to carry an SRS carrier switching trigger for group switching. In another embodiment, DCI3 format is used to both trigger SRS carrier switching and control the SRS TPC.

In another embodiment, a UE receives a DL grant triggering aperiodic SRS carrier switching transmission, and the UE transmits the SRS on the different carrier in the special subframe of that carrier, where that special subframe is the one that is just prior to the subframe in which the HARQ-ACK corresponding to the DL grant is to be transmitted.

For Switching Carrier Identifications:

In a first embodiment, SRS to and from carrier switching control is to use a preconfigured pattern table of to- and from-carriers and to use a preconfigured equation for the exact sequence of switching;

If this solution is too restrictive, it is also possible to still use a preconfigured switching pattern table but enable choosing the exact switching pattern at a given instant by sending the table index via DCI. The index could be send along the SRS trigger for the case of A-SRS, or ahead of P-SRS transmission to reconfigure the switching of P-SRS;

In another embodiment, SRS to and from carrier switching control is to use a preconfigured pattern table of to- and from-carriers. The identity of the to and from carriers for the next switching is then signaled via DCI as an index to this table.

Finally, if full flexibility is desired, one could send the carrier number for the to and from carrier in DCI for each switching instance. Note that this is the costliest solution in terms of overhead if a large number of carrier is to be addressed, as the required number of bits is $$\log 2(\text{number of UL CCs}) + \log 2(\text{number of SRS CCs}).$$

For example a 5DL+2UL system would require 4 bits at a minimum.

Figure 6:
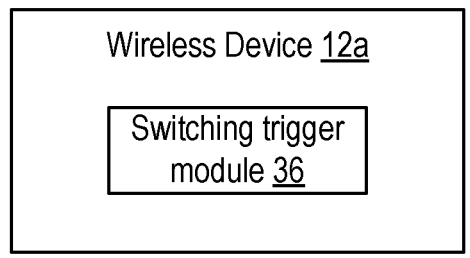
FIG. 6 is a block diagram of another exemplary embodiment of wireless device 12 in accordance with the principles of the disclosure.
Figure 7:
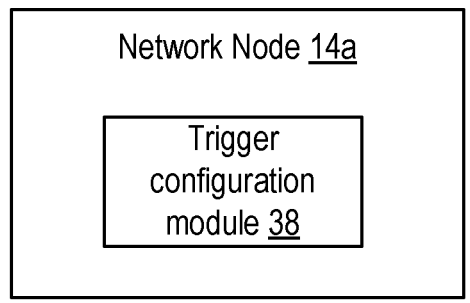
FIG. 7 is a block diagram of another exemplary embodiment of network node 14 in accordance with the principles of the disclosure.

In yet another embodiment, option 3 for SRS to and from switching control is to signal via DCI the carrier number for both the two and from carrier. FIG. 6 is a block diagram of another exemplary embodiment of wireless device 12 in accordance with the principles of the disclosure. Wireless device 12 includes switching trigger processing module 36 for performing the functions described with respect to switching trigger code 24. FIG. 7 is a block diagram of another exemplary embodiment of network node 14 in accordance with the principles of the disclosure. Network node 14 includes trigger configuration processing module 38 for performing the functions described with respect to trigger configuration code 34.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

Some embodiments include:

Embodiment 1

A network node 14, comprising:
processing circuitry 28 configured to:
configure an aperiodic sounding reference signal, A-SRS, switching trigger, the A-SRS switching trigger being one of: a downlink control information, DCI, of a predetermined DCI format and a DCI of another predetermined DCI format for group switching; and
transmit the configured A-SRS switching trigger to a wireless device 12.

Embodiment 2

The network node 14 of Embodiment 1, wherein the predetermined DCI format is one of 2, 2A and 3, and the other predetermined DCI format for group switching is 1A.

Embodiment 3

The network node 14 of any one of Embodiments 1-2, wherein the processing circuitry 28 is further configured to:
configure the wireless device 12 to use a preconfigured pattern table of to and from carriers to determine a sequence for performing A-SRS carrier switching, the A-SRS switching trigger further configured to trigger the wireless device 12 to use the preconfigured pattern table for performing A-SRS carrier switching.

Embodiment 4

The network node 14 of Embodiment 3, wherein the configuring of the wireless device 12 to use the preconfigured pattern table includes configuring the wireless device 12 to use a preconfigured equation to determine the sequence of A-SRS carrier switching.

Embodiment 5

The network node 14 of any of Embodiments 3-4, wherein the DCI indicates an index of the preconfigured pattern table for performing A-SRS carrier switching.

Embodiment 6

The network node 14 of any one of Embodiments 1-2, wherein the DCI indicates both the to and from carriers for performing A-SRS carrier switching.

Embodiment 7

A method, comprising:
processing circuitry 28 configured to:
configure an aperiodic sounding reference signal, A-SRS, switching trigger, the A-SRS switching trigger being one of: a downlink control information, DCI, of a predetermined DCI format and a DCI of another predetermined DCI format for group switching; and
transmit the configured A-SRS switching trigger to a wireless device 12.

Embodiment 8

The method of Embodiment 7, wherein the predetermined DCI format is one of 2, 2A and 3, and the other predetermined DCI format for group switching is 1A.

Embodiment 9

The method of any one of Embodiments 7-8, wherein the processing circuitry is further configured to:
configure the wireless device 12 to use a preconfigured pattern table of to and from carriers to determine a sequence for performing A-SRS carrier switching, the A-SRS switching trigger further configured to trigger the wireless device 12 to use the preconfigured pattern table for performing A-SRS carrier switching.

Embodiment 10

The method of Embodiment 9, wherein the configuring of the wireless device 12 to use the preconfigured pattern table includes configuring the wireless device 12 to use a preconfigured equation to determine the sequence of A-SRS carrier switching.

Embodiment 11

The method of any of Embodiments 9-10, wherein the DCI indicates an index of the preconfigured pattern table for performing A-SRS carrier switching.

Embodiment 12

The method of any one of Embodiments 7-8 wherein the DCI indicates both the to and from carriers for performing A-SRS carrier switching.

Embodiment 13

A wireless device 12, comprising:
processing circuitry 18 configured to:
receive an aperiodic sounding reference signal, A-SRS, switching trigger, the A-SRS switching trigger being one of: a downlink control information, DCI, of a predetermined DCI format and a DCI of another predetermined DCI format for group switching; and
trigger A-SRS switching based on the received A-SRS switching trigger.

Embodiment 14

The wireless device 12 of Embodiment 13, wherein the predetermined DCI format is one of 2, 2A and 3, and the other predetermined DCI format for group switching is 1A.

Embodiment 15

The wireless device 12 of any one of Embodiments 13-14, wherein the processing circuitry 18 is further configured to:
use a preconfigured pattern table of to and from carriers to determine a sequence for performing A-SRS carrier switching.

Embodiment 16

The wireless device 12 of Embodiment 15, wherein the using of the preconfigured pattern table includes using a preconfigured equation to determine the sequence of A-SRS carrier switching.

Embodiment 17

The wireless device 12 of any of Embodiments 15-16, wherein the DCI indicates an index of the preconfigured pattern table for performing A-SRS carrier switching.

Embodiment 18

The wireless device 12 of any one of Embodiments 13-14, wherein the DCI indicates both the to and from carriers for performing A-SRS carrier switching.

Embodiment 19

A method, comprising:
receiving an aperiodic sounding reference signal, A-SRS, switching trigger, the A-SRS switching trigger being one of: a downlink control information, DCI, of a predetermined DCI format and a DCI of another predetermined DCI format for group switching; and
triggering A-SRS switching based on the received A-SRS switching trigger.

Embodiment 20

The method of Embodiment 19, wherein the predetermined DCI format is one of 2, 2A and 3, and the other predetermined DCI format for group switching is 1A.

Embodiment 21

The method of any one of Embodiments 19-20, further comprising using a preconfigured pattern table of to and from carriers to determine a sequence for performing A-SRS carrier switching.

Embodiment 22

The method of Embodiment 21, wherein the using of the preconfigured pattern table includes using a preconfigured equation to determine the sequence of A-SRS carrier switching.

Embodiment 23

The method of any of Embodiments 21-22, wherein the DCI indicates an index of the preconfigured pattern table for performing A-SRS carrier switching.

Embodiment 24

The method of any one of Embodiments 19-20, wherein the DCI indicates both the to and from carriers for performing A-SRS carrier switching.

Embodiment 25

A network node 14, comprising:
trigger configuration processing module 38 configured to:
configure an aperiodic sounding reference signal, A-SRS, switching trigger, the A-SRS switching trigger being one of: a downlink control information, DCI, of a predetermined DCI format and a DCI of another predetermined DCI format for group switching; and
transmit the configured A-SRS switching trigger to a wireless device 12.

Embodiment 26

A wireless device 12, comprising:
switching trigger processing module 36 configured to:
receive an aperiodic sounding reference signal, A-SRS, switching trigger, the A-SRS switching trigger being one of: a downlink control information, DCI, of a predetermined DCI format and a DCI of another predetermined DCI format for group switching; and
trigger A-SRS switching based on the received A-SRS switching trigger.

Some other embodiments include:
According to one aspect of the disclosure, a network node 14 is provided.
Network node 14 includes processing circuitry 28 configured to: configure an aperiodic sounding reference signal, A-SRS, carrier switching trigger, the A-SRS carrier switching trigger configured to cause a wireless device 12 to performing A-SRS carrier switching from a first carrier to second carrier for transmitting an A-SRS using the second carrier, and transmit the configured A-SRS carrier switching trigger to the wireless device 12.
According to one embodiment of this aspect, the A-SRS carrier switching trigger is included in a downlink control information, DCI, having a DCI format. According to one embodiment of this aspect, the DCI format for wireless device A-SRS carrier switching is one of DCI formats 2, 2A and 1A. According to one embodiment of this aspect, the DCI indicates both the first carrier and second carrier for performing A-SRS carrier switching. According to one embodiment of this aspect, the DCI format for group A-SRS carrier switching is derived from DCI format 3. According to one embodiment of this aspect, the SRS is power controlled by the DCL.

According to one embodiment of this aspect, the processing circuitry 28 is further configured to: configure the wireless device 12 to use a preconfigured pattern table for determining the second carrier from a plurality of carriers for performing A-SRS carrier switching. The A-SRS carrier switching trigger is further configured to trigger the wireless device 12 to use the preconfigured pattern table for performing A-SRS carrier switching. According to one embodiment of this aspect, the preconfigured pattern table is configured using RRC signaling. According to one embodiment of this aspect, the configuring of the wireless device 12 to use the preconfigured pattern table includes configuring the wireless device 12 to use a preconfigured equation to determine the second carrier from the plurality of carriers for performing A-SRS carrier switching. According to one embodiment of this aspect, the DCI indicates an index in the preconfigured pattern table for performing A-SRS carrier switching.

According to another aspect of the disclosure, a method for a network node 14 is provided. An aperiodic sounding reference signal, A-SRS, carrier switching trigger is configured (S100). The A-SRS carrier switching trigger is configured to cause a wireless device 12 to perform A-SRS carrier switching from a first carrier to second carrier for transmitting an A-SRS using the second carrier. The configured A-SRS carrier switching trigger is transmitted to the wireless device (S102).

According to one embodiment of this aspect, the A-SRS carrier switching trigger is included in a downlink control information, DCI, having a DCI format. According to one embodiment of this aspect, the DCI format for wireless device A-SRS carrier switching is one of DCI formats 2, 2A and 1A. According to one embodiment of this aspect, the DCI format for group A-SRS carrier switching is derived from DCI format 3. According to one embodiment of this aspect, the SRS is power controlled by the DCL. According to one embodiment of this aspect, the DCI indicates both the first carrier and second carrier for performing A-SRS carrier switching.

According to one embodiment of this aspect, the wireless device 12 is configured to use a preconfigured pattern table for determining the second carrier from a plurality of carriers for performing A-SRS carrier switching. The A-SRS carrier switching trigger is further configured to trigger the wireless device 12 to use the preconfigured pattern table for performing A-SRS carrier switching. According to one embodiment of this aspect, the preconfigured pattern table is configured using RRC signaling. According to one embodiment of this aspect, the configuring of the wireless device 12 to use the preconfigured pattern table includes configuring the wireless device 12 to use a preconfigured equation to determine the second carrier from the plurality of carriers for performing A-SRS carrier switching. According to one embodiment of this aspect, the DCI indicates an index in the preconfigured pattern table for performing A-SRS carrier switching.

According to another aspect of the disclosure, a wireless device 12 is provided. The wireless device 12 includes processing circuitry 18 configured to: receive an aperiodic sounding reference signal, A-SRS, carrier switching trigger, perform A-SRS carrier switching from a first carrier to second carrier for transmitting an A-SRS using the second carrier based on the A-SRS carrier switching trigger, and transmit A-SRS on the second carrier.

According to one embodiment of this aspect, the A-SRS carrier switching trigger is included in a downlink control information, DCI, having a DCI format. According to one embodiment of this aspect, the DCI format for wireless device A-SRS carrier switching is one of DCI formats 2, 2A and 1A. According to one embodiment of this aspect, the DCI format for group A-SRS carrier switching is derived from DCI format 3. According to one embodiment of this aspect, the SRS is power controlled by the DCL. According to one embodiment of this aspect, the DCI indicates both the first carrier and second carrier for performing A-SRS carrier switching.

According to one embodiment of this aspect, the processing circuitry 18 is further configured to use a preconfigured pattern table for determining the second carrier from a plurality of carriers for performing A-SRS carrier switching. The A-SRS carrier switching trigger is further configured to trigger the wireless device 12 to use the preconfigured pattern table for performing A-SRS carrier switching. According to one embodiment of this aspect, the preconfigured pattern table is configured using RRC signaling. According to one embodiment of this aspect, using of the preconfigured pattern table includes using a preconfigured equation to determine the second carrier from the plurality of carriers for performing A-SRS carrier switching. According to one embodiment of this aspect, the DCI indicates an index in the preconfigured pattern table for performing A-SRS carrier switching.

According to one aspect of the disclosure, a method for a wireless device 12 is provided. An aperiodic sounding reference signal, A-SRS, carrier switching trigger is received (S104). A-SRS carrier switching is performed from a first carrier to second carrier for transmitting an A-SRS using the second carrier based on the A-SRS carrier switching trigger (S106). A-SRS is transmitted on the second carrier (S108).

According to one embodiment of this aspect, the A-SRS carrier switching trigger is included in a downlink control information, DCI, having a DCI format. According to one embodiment of this aspect, the DCI format for wireless device A-SRS carrier switching is one of DCI format 2, 2A and 1A. According to one embodiment of this aspect, the DCI format for group A-SRS carrier switching is derived from DCI format 3. According to one embodiment of this aspect, the SRS is power controlled by the DCL. According to one embodiment of this aspect, the DCI indicates both the first carrier and second carrier for performing A-SRS carrier switching.

According to one embodiment of this aspect, a preconfigured pattern table is used for determining the second carrier from a plurality of carriers for performing A-SRS carrier switching. The A-SRS carrier switching trigger is further configured to trigger the wireless device 12 to use the preconfigured pattern table for performing A-SRS carrier switching. According to one embodiment of this aspect, the preconfigured pattern table is configured using RRC signaling. According to one embodiment of this aspect, using of the preconfigured pattern table includes using a preconfigured equation to determine the second carrier from the plurality of carriers for performing A-SRS carrier switching. According to one embodiment of this aspect, the DCI indicates an index in the preconfigured pattern table for performing A-SRS carrier switching.

According to another aspect of the disclosure, a network node 14 is provided. A trigger configuration processing module 38 is configured to configure an aperiodic sounding reference signal, A-SRS, carrier switching trigger. The A-SRS carrier switching trigger is configured to cause a wireless device 12 to perform A-SRS carrier switching from a first carrier to second carrier for transmitting an A-SRS using the second carrier. The trigger configuration processing module 38 is configured to transmit the configured A-SRS carrier switching trigger to the wireless device 12.

According to another aspect of the disclosure, a wireless device 12 is provided. The wireless device 12 includes switching trigger processing module 36 configured to: receive an aperiodic sounding reference signal, A-SRS, carrier switching trigger, perform A-SRS carrier switching from a first carrier to second carrier for transmitting an A-SRS using the second carrier based on the A-SRS carrier switching trigger, and transmit A-SRS on the second carrier.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node, comprising:
   processing circuitry configured to:
      configure an aperiodic sounding reference signal, A-SRS, carrier switching trigger, the A-SRS carrier switching trigger configured to cause a wireless device to perform A-SRS carrier switching from a first carrier to second carrier for transmitting an A-SRS using the second carrier;
      configure the wireless device to use a preconfigured pattern table of first carriers and second carriers for determining the second carrier from a plurality of carriers for performing A-SRS carrier switching, the first carriers being carriers the wireless device is switching from and the second carriers being carriers the wireless device is switching to, the A-SRS carrier switching trigger being further configured to trigger the wireless device to use the preconfigured pattern table for performing A-SRS carrier switching; and
      transmit the configured A-SRS carrier switching trigger to the wireless device, the A-SRS carrier switching trigger being included in a downlink control information, DCI, having a DCI format and the DCI indicating an index in the preconfigured pattern table for performing A-SRS carrier switching, the index indicating a switching pattern in the preconfigured pattern table, the switching pattern comprising the first carrier and the second carrier.

2. A method for a network node, the method comprising:

configuring an aperiodic sounding reference signal, A-SRS, carrier switching trigger, the A-SRS carrier switching trigger configured to cause a wireless device to perform A-SRS carrier switching from a first carrier to second carrier for transmitting an A-SRS using the second carrier;

configuring the wireless device to use a preconfigured pattern table of first carriers and second carriers for determining the second carrier from a plurality of carriers for performing A-SRS carrier switching, the first carriers being carriers the wireless device is switching from and the second carriers being carriers the wireless device is switching to, the A-SRS carrier switching trigger being further configured to trigger the wireless device to use the preconfigured pattern table for performing A-SRS carrier switching; and transmitting the configured A-SRS carrier switching trigger to the wireless device, the A-SRS carrier switching trigger being included in a downlink control information, DCI, having a DCI format and the DCI indicating an index in the preconfigured pattern table for performing A-SRS carrier switching, the index indicating a switching pattern in the preconfigured pattern table, the switching pattern comprising the first carrier and the second carrier.

3. The method of claim 2, wherein the DCI format for wireless device A-SRS carrier switching is one of DCI formats 2, 2A and 1A.

4. The method of claim 2, wherein the DCI format for group A-SRS carrier switching is derived from DCI format 3.

5. The method of claim 4, wherein the SRS is power controlled by the DCI.

6. The method of claim 2, wherein the DCI indicates both the first carrier and second carrier for performing A-SRS carrier switching.

7. The method of claim 2, wherein the preconfigured pattern table is configured using RRC signaling.

8. A wireless device, comprising:
processing circuitry configured to:
receive an aperiodic sounding reference signal, A-SRS, carrier switching trigger, the A-SRS carrier switching trigger being included in a downlink control information, DCI, having a DCI format and the DCI indicating an index in a preconfigured pattern table for performing A-SRS carrier switching;

use the preconfigured pattern table of first carriers and second carriers for determining the second carrier from a plurality of carriers for performing A-SRS carrier switching, the first carriers being carriers the wireless device is switching from and the second carriers being carriers the wireless device is switching to, the A-SRS carrier switching trigger being further configured to trigger the wireless device to use the preconfigured pattern table for performing A-SRS carrier switching, the index indicating a switching pattern in the preconfigured pattern table, the switching pattern comprising the first carrier and the second carrier;

perform A-SRS carrier switching from a first carrier to second carrier for transmitting an A-SRS using the second carrier in response to the A-SRS carrier switching trigger; and transmit A-SRS on the second carrier.

9. A method for a wireless device, the method comprising:

receiving an aperiodic sounding reference signal, A-SRS, carrier switching trigger, the A-SRS carrier switching trigger being included in a downlink control information, DCI, having a DCI format and the DCI indicating an index in a preconfigured pattern table for performing A-SRS carrier switching;

using the preconfigured pattern table of first carriers and second carriers for determining the second carrier from a plurality of carriers for performing A-SRS carrier switching, the first carriers being carriers the wireless device is switching from and the second carriers being carriers the wireless device is switching to, the A-SRS carrier switching trigger being further configured to trigger the wireless device to use the preconfigured pattern table for performing A-SRS carrier switching, the index indicating a switching pattern in the preconfigured pattern table, the switching pattern comprising the first carrier and the second carrier;

performing A-SRS carrier switching from a first carrier to second carrier for transmitting an A-SRS using the second carrier in response to the A-SRS carrier switching trigger; and transmitting A-SRS on the second carrier.

10. The method of claim 9, wherein the DCI format for wireless device A-SRS carrier switching is one of DCI format 2, 2A and 1A.

11. The method of claim 9, wherein the DCI indicates both the first carrier and second carrier for performing A-SRS carrier switching.

* * * * *